(12) United States Patent
Semenov et al.

(10) Patent No.: US 6,321,450 B1
(45) Date of Patent: Nov. 27, 2001

(54) METHOD FOR PRODUCING A GAS GENERATOR OF WELDED-BRAZED CONSTRUCTION

(75) Inventors: Viktor Nikonorovich Semenov, Khimki; Gennady Grigorievich Derkach, Moscow; Boris Ivanovich Katorgin, Khimki; Vladimir Konstantinovich Chvanov, Khimki; Jury Vasilievich Movchan, Khimki; Leonid Alexeevich Tumanov, Khimki; Nikolai Kondratievich Dudkin, Khimki; Valery Petrovich Mordashov, Moscow; Anatoly Lukich Loginov, Khimki; Oleg Andreevich Masljukov, Khimki; Larisa Mikhailovna Panaskina, Khimki; Alexandr Nikolaevich Vycherov, Khimki; Nikolai Fedorovich Molev, Khimki; Jury Alexandrovich Pestov, Khimki; Alexandr Alexandrovich Vasin, Moscow; Vladimir Jurievich Bogushev; Nikolai Mikhailovich Grigorkin, both of Khimki, all of (RU)

(73) Assignee: Otkrytoe Aktsionernoe Obschestvo Nauchnoproizvodstvennoe Obiedinenie "Energomash" Imeni Akademika V.P. Glushko (RU)

( * ) Notice: Subject to any disclaimer, the term of this patent is extended or adjusted under 35 U.S.C. 154(b) by 0 days.

(21) Appl. No.: 09/410,875

(22) Filed: Oct. 1, 1999

(30) Foreign Application Priority Data

Mar. 1, 1999 (RU) ................................................ 99103736

(51) Int. Cl.$^7$ .................................................... B21D 53/00
(52) U.S. Cl. .......................................... 29/890.01; 29/469
(58) Field of Search ............................... 29/890.01, 469, 29/527.2; 228/183

(56) References Cited

U.S. PATENT DOCUMENTS

| | | |
|---|---|---|
| 3,147,592 | 9/1964 | Rose et al. . |
| 3,768,256 * | 10/1973 | Butter et al. .......................... 60/260 |
| 4,825,531 * | 5/1989 | Nold ...................................... 29/447 |
| 5,199,155 * | 4/1993 | Cord et al. ............................. 29/463 |
| 5,407,120 * | 4/1995 | Philpot ................................. 228/155 |
| 5,501,011 * | 3/1996 | Pellet ................................. 29/890.01 |

* cited by examiner

*Primary Examiner*—I Cuda-Rosenbaum
(74) *Attorney, Agent, or Firm*—Blakely Sokoloff Taylor & Zafman

(57) ABSTRACT

A gas generator is produced of separate units, including a mixing head, a casing and an outlet branch pipe, which are interjoined by welding. The mixing head is welded to the outlet branch pipe through a spacer and a structural spherical casing. The spacer and the outlet branch pipe are made of two inter-brazed envelopes, the inner envelopes of the spacer and the branch pipe are welded at their end faces by electron-beam welding, and the outer structural envelopes are welded by electron-arc welding using a split ring. The spacer is joined to the mixing head by automatic gas-shielded welding. The spherical casing of the gas generator is welded to the outlet branch pipe and the mixing head after the spacer is welded to the mixing head and the outlet branch pipe.

4 Claims, 3 Drawing Sheets

METHOD FOR PRODUCING A GAS GENERATOR OF WELDED-BRAZED CONSTRUCTION

FIELD OF THE INVENTION

The invention relates to the field of power machine building and is concerned with the production of gas generators for liquid-propellant rocket engines.

BACKGROUND OF THE INVENTION

Different methods for producing gas generators for liquid-propellant rocket engines (LRE) are known from prior art. The construction of a gas generator is disclosed in U.S. Pat. No. 3,147,592, NPC 60-39.46, 1964, in which a cover together with a feed branch pipe is welded to a mixing head. Injectors are mounted in the head. The mixing head is secured to a casing using a threaded joint. The casing is made as a single unit with a chamber and fire branch pipe.

A disadvantage of this method is that it does not ensure reliability of an assembly for high-thrust liquid propellant rocket engines.

The technical solution most similar to the present invention is a method for producing a gas generator of welded-brazed construction for a liquid-propellant rocket engine, comprising the steps of assembling, brazing and welding a mixing head, having a cover with a branch pipe for supplying one of the propellant components, and injectors rigidly connected to the cover, and a bottom and a main line for supplying another component, the step of producing a casing with an outlet branch pipe, and subsequent steps of welding the casing to the mixing head (see, e.g. I. I. Gorev "Basics of Producing Liquid-Propellant Rocket Engines," Moscow, 1969, pp. 10–12).

A disadvantage of this technical solution is insufficient reliability of the welded and brazed joints, which do not ensure higher strength and operation properties of gas generators, especially at high operation pressures, for example, 600 atmospheres, and at a relatively high thermal factor of the assembly.

SUMMARY OF THE INVENTION

The object of the present invention is to improve the technological aspects of the method for producing the construction and to improve the strength and operating characteristics by ensuring high quality of the welded and brazed joints.

The technical result from realization of the invention is that when there is improvement of the technological aspects of production, the reliability of the assembly is enhanced due to the obtained high quality in the constructions of the welded and brazed joints. Due to this it was possible to create an oxidizing gas generator for high-thrust liquid-propellant rocket engines. The essence of the invention is that in a method for producing a welded-brazed construction of an LRE gas generator comprising the steps of producing a mixing head provided with a branch pipe for supplying a first propellant component, a pipeline for supplying a second propellant component, a casing, and an outlet branch pipe, and subsequently joining them to each other by welding, a double-layer spacer, consisting of an outer structural envelope and a fire wall having ribs on its outer side, and a connecting split ring are additionally produced, the outlet branch pipe is made double-layer consisting of an outer structural envelope and a fire wall having ribs on its outer side, the casing is made in the form of a spherical envelope having three holes, two of which are made coaxial from different sides in walls of the spherical envelope and serve for connection to the mixing head and the outlet branch pipe respectively, and the third hole serves for connection to a main line for supplying the second propellant component, before fastening the casing, the mixing head and the outlet branch pipe, the outer structural envelopes and the fire walls respectively of the double-layer spacer and outlet branch pipe are preliminarily joined to each other by brazing, wherein prior to brazing a high-temperature solder is applied to the inner surfaces of the structural envelopes and to the outer surfaces of the fire walls, brazing is carried out at a temperature of 960–980° C. with the end faces of the fire walls stopped against each other with the provision of an axial slot between the structural envelopes, then welding the end faces of the double-layer spacer fire wall and the outlet branch pipe fire wall is effected by electron-beam welding, wherein an electron beam is directed into the slot between the structural envelopes, then the double-layer spacer structural envelope and the outlet branch pipe structural envelope are welded to each other using a connecting split ring by argon-arc welding, then the double-layer spacer is welded to the mixing head by argon-arc gas-shielded welding, then the interjoined mixing head, double-layer spacer and outlet branch pipe are placed in the casing to which the main line for supplying the second propellant component is preliminarily welded, and the casing is welded to the mixing head and the outlet branch pipe.

Joining the casino to the mixing head and joining the branch pipe for supplying the first propellant component to the mixing head is carried out by argon-arc gas-shielded welding, additional beads being made along the weld seam.

Furthermore, a ring backing plate is made and welding the casing to the outlet branch pipe is effected on the made backing plate which is preliminarily attached to the outlet branch pipe, and additional beads are made along the made weld seam boundary.

Welding the casing to the branch pipe for supplying the second propellant component is done by argon-arc welding on a removable copper backing plate, which is placed on the inner side of the weld root, and additional beads are made along the made weld seam boundary.

DETAILED DESCRIPTION OF THE PREFERRED EMBODIMENTS

Figure 1:
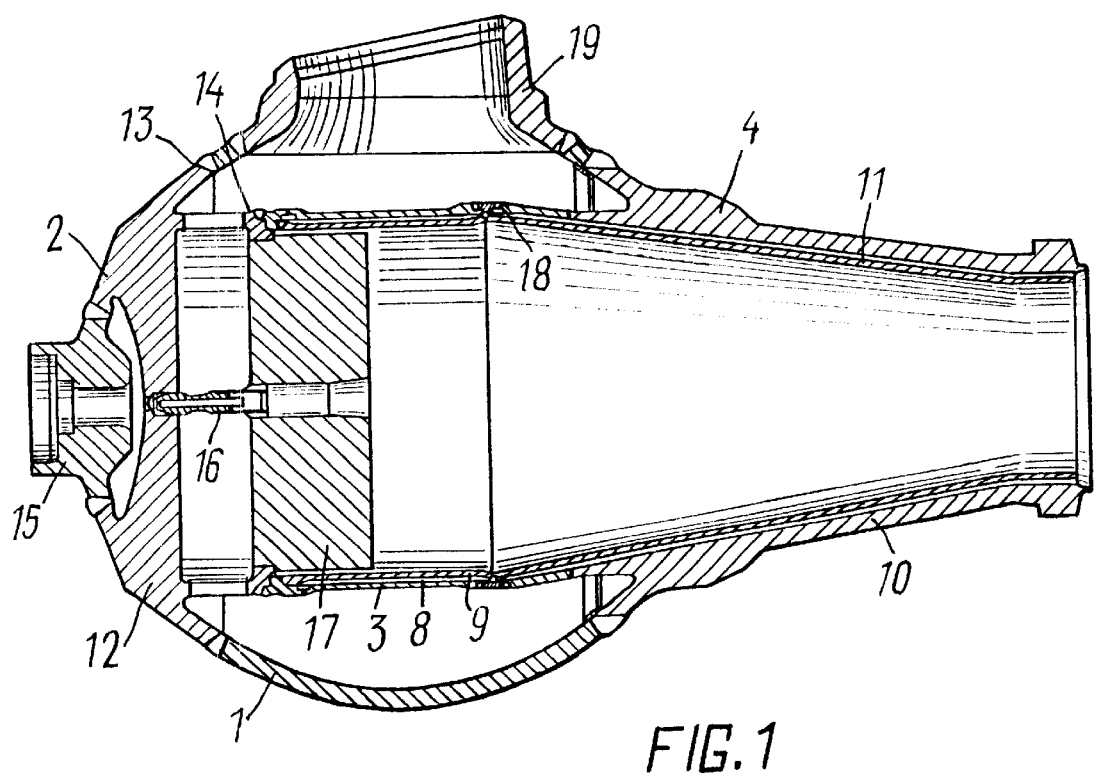
FIG. 1 shows a gas generator manufactured by the described method.
Figure 7:
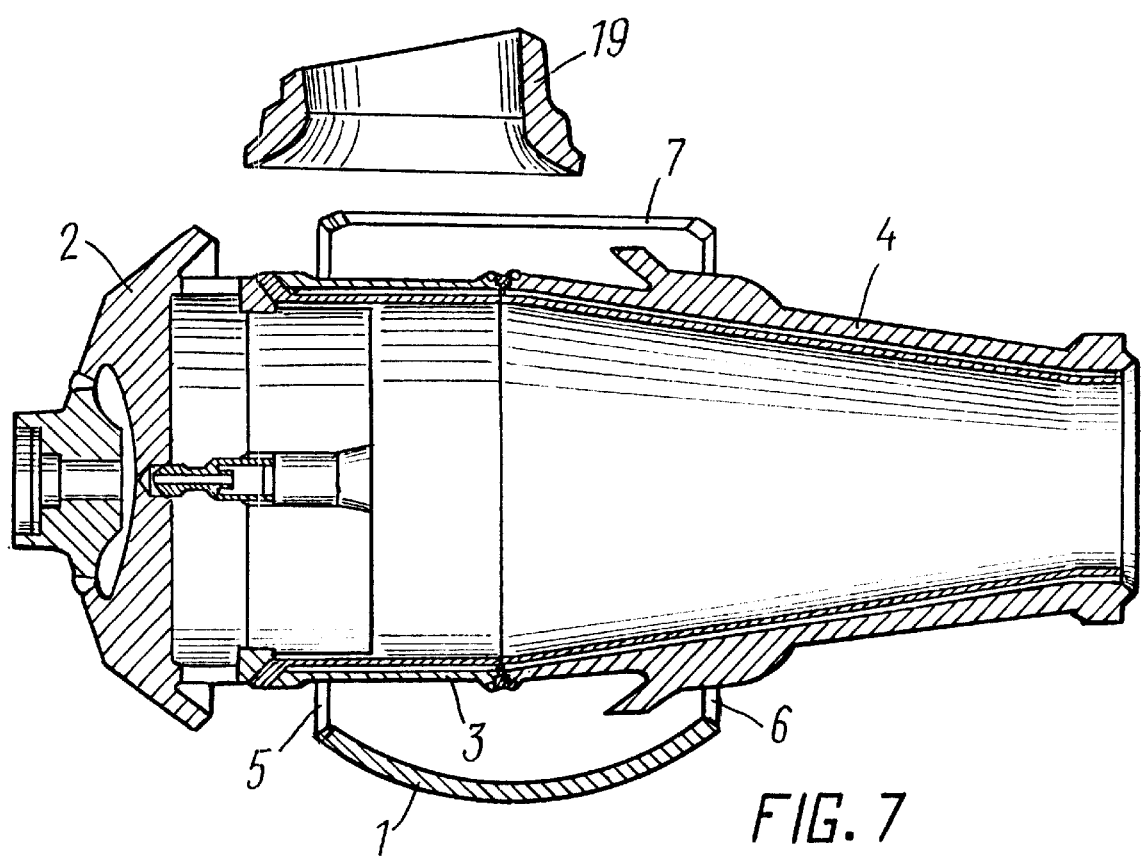
FIG. 7 shows the structural casing pulled over the welded-brazed construction consisting of a mixing head, an outlet branch pipe and a spacer, before welding it to the mixing head and the outlet branch pipe, according to the invention.

A has generator produced by the method described above consists of a structural casing 1 (FIG. 1), a mixing head 2, a spacer 3, and an outlet branch pipe 4. The structural casing 1 is made spherical with two coaxially positioned holes 5 and 6 and an additional hole 7 (FIG. 7) ensuring communication of space of the mixing head of the gas generator with a main line for supplying a second propellant component. The spacer 3 consists of a structural envelope 8 and a fire wall 9, and the outlet branch pipe 4 consists of a structural envelope 10 and a fire wall. The mixing head 2 is preliminarily assembled of a cover 12 and with two coaxially positioned joining surfaces 13 and 14 of a branch pipe 15 for supplying a first propellant component and fastened on the cover 12 by welding, and injectors 16 rigidly connected to the cover 12, and a bottom 17. The outlet branch pipe 4 is made in the form of a tapered bell mouth with a joining surface 18 at the end of larger diameter. A branch pipe 19 supplying the second propellant component is welded to the spherical surface of the structural casing 1.

In the course of manufacturing a gas generator, the spacer 3 is assembled, mounting the fire wall 9 inside the structural envelope 8. Then the outlet branch pipe 4 is assembled, mounting the fire wall 11 inside the structural envelope 10.

Figure 2:
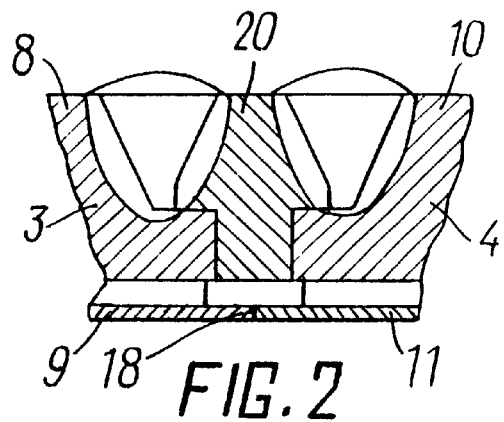
FIG. 2 shows a welded joint of a spacer and an outlet branch pipe, according to the invention.

Before these assembly steps, a layer of copper is applied to the inner surface of the structural envelopes 8 and 10, and a copper-silver solder is applied to the outer surface of the fire walls 9 and 11, attached to the structural envelopes 8 and 10, respectively. Brazing is carried out at a temperature of 960–980° C. During the brazing, projection of the end faces at the place of contact of the fire walls 9 and 11 above the end faces of the structural envelopes 8 and 10 is ensured (FIG. 2).

End faces 18 of the fire walls 9 and 11, abutting against each other, are welded to each other by electron-beam welding. Wherein the beam is directed between end faces of the jackets 8 and 10 (FIG. 2). The spacer 3 of one of the end face surfaces is fastened to the joining surface 18 of the outlet branch pipe 4 using a connecting ring 20. The spacer 3 and the outlet branch pipe 4 are welded to the connecting ring 20 by argon-arc gas-shielded welding.

Figure 3:
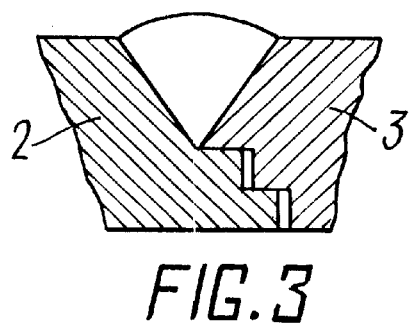
FIG. 3 shows a welded joint of a mixing head and a spacer, according to the invention.

The spacer 3 is welded to the mixing head 2 (FIG. 3) by argon-arc gas-shielded welding.

The branch pipe 19 is preliminarily fastened on the structural casing 1 (FIG. 7) in the hole 7 by argon-arc gas-shielded welding on a removable backing plate. After the backing plate is removed, a weld root is fused by manual argon-arc welding with a filling wire, and additional beads 22 are made along the weld seam boundary.

The structural casing 1 with the supply branch pipe 19 is, through the holes 5 and 6 (FIG. 7), put on the welded-brazed construction consisting of the mixing head 2, spacer 3 and outlet branch pipe 4 as far as possible, after which welding is carried out.

Figure 4:
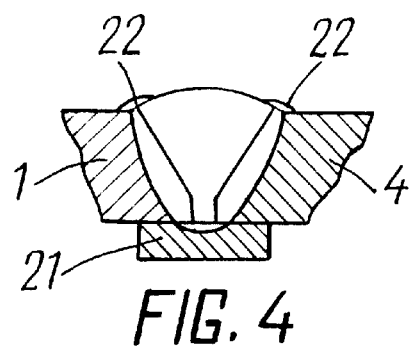
FIG. 4 shows a welded joint of the casing and an outlet branch pipe, according to the invention.

The structural casing 1 is gas-shield welded to the outlet branch pipe 4 (FIG. 4) on a remaining backing plate 21, and additional beads 22 are made along the weld seam boundary.

Figure 5:
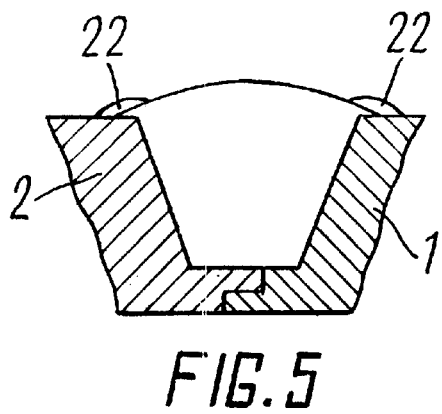
FIG. 5 shows a welded joint of a mixing head and the casing, according to the invention.
Figure 6:
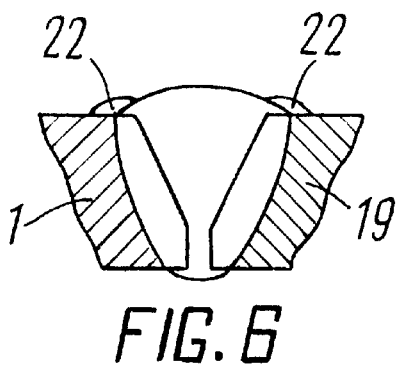
FIG. 6 shows a welded joint of the casing and an supply branch pipe, according to the invention.

Fixed attachment of the structural casing 1 to the mixing head 2 (FIG. 5) and joining the branch pipe 15 to the mixing head 2 may be carried out with argon-arc gas-shielded welding, additional beads 22 being made along the weld seam boundary.

The proposed method made it possible to create and produce an oxidizing gas generator for a high-thrust LRE, which has high reliability and power parameters.

What is claimed is:

1. A method for producing a welded-brazed construction of a gas generator of a liquid-propellant rocket engine, comprising the following steps:

producing a mixing head provided with a branch pipe for supplying a first propellant component, a pipeline for supplying a second propellant component, a casing, and an outlet branch pipe, and subsequently joining them to each other by welding, additionally producing a double-layer spacer consisting of an outer structural envelope and a fire wall having ribs on its outer side, and a connecting split ring, making the outlet branch pipe double-layer, consisting of an outer structural envelope and a fire wall having ribs on its outer side, making the casing in the form of a spherical envelope having first, second and third holes, said first and second of which are made coaxial from different sides in walls of the spherical envelope and serve for connection to the mixing head and the outlet branch pipe respectively, and said third hole serves for connection to the pipeline for supplying the second propellant component, preliminarily attaching the outer structural envelopes and the fire walls respectively of the double-layer spacer and outlet branch pipe to each other by brazing before connecting the casing, the mixing head and the outlet branch pipe, prior to brazing, applying a high-temperature solder onto the inner surfaces of the structural envelopes and to the outer surfaces of the fire walls, carrying out brazing at a temperature of 960–980° C. with the end faces of the fire walls stopped against each other with the provision of an axial slot between the structural envelopes, welding the face ends of the double-layer spacer fire wall and the outlet branch pipe fire wall is effected by electron-beam welding, directing an electron beam into the slot between the structural envelopes, welding the double-layer spacer structural envelope and the outlet branch pipe structural envelope to each other by argon-arc welding using a connecting split ring, welding the double-layer spacer to the mixing head by automatic gas-shielded welding, placing the joined mixing head, double-layer spacer and outlet branch pipe in the casing to which the pipeline for supplying the second propellant component has been preliminarily welded, welding the casing to the mixing head and the outlet branch pipe.

2. A method according to claim 1, wherein connecting the casing to the mixing head and connecting the branch pipe for supplying the first propellant component to the mixing head are carried out by argon-arc gas-shielded welding, additional beads being made along a weld seam.

3. A method according to claim 1, wherein a ring backing plate is made, and welding the casing to the outlet branch pipe is effected on the made backing plate which is preliminarily fastened to the outlet branch pipe, and additional beads are made along the made weld seam boundary.

4. A method according to claim 1, wherein welding the casing to the branch pipe for supplying the second propellant component is effected by argon-arc welding on a removable copper backing plate, which is placed from the inner side of a weld root, additional beads are made along the made weld seam boundary.

* * * * *